US007093877B2

(12) United States Patent
Duffy

(10) Patent No.: US 7,093,877 B2
(45) Date of Patent: Aug. 22, 2006

(54) GUTTER MOUNTED DECK LID HINGE

(75) Inventor: Michael J. Duffy, Midland (CA)

(73) Assignee: M & C Corporation, Sterling Heights, MI (US)

( * ) Notice: Subject to any disclaimer, the term of this patent is extended or adjusted under 35 U.S.C. 154(b) by 0 days.

(21) Appl. No.: 10/774,546

(22) Filed: Feb. 9, 2004

(65) Prior Publication Data

US 2005/0173943 A1 Aug. 11, 2005

(51) Int. Cl.
*B62D 25/12* (2006.01)

(52) U.S. Cl. .................................................... 296/76

(58) Field of Classification Search .................. 296/76, 296/146.9; 16/277–308; 267/170, 171, 267/178, 179, 155

See application file for complete search history.

(56) References Cited

U.S. PATENT DOCUMENTS

| | | | | |
|---|---|---|---|---|
| 1,387,833 | A | 8/1921 | Cheney | |
| 2,235,984 | A * | 3/1941 | Devereaux | 16/295 |
| 2,482,883 | A * | 9/1949 | Thomas | 56/400 |
| 2,720,676 | A | 10/1955 | Vigmostad | |
| 3,024,488 | A * | 3/1962 | Germann | 16/306 |
| 3,351,975 | A | 11/1967 | Goto | |
| 3,363,281 | A * | 1/1968 | Giancarlo | 16/288 |
| 3,810,275 | A * | 5/1974 | Smith | 16/298 |
| 4,206,944 | A * | 6/1980 | Kumagai et al. | 296/76 |
| 4,524,438 | A * | 6/1985 | Einhaus | 369/75.11 |
| 4,580,315 | A * | 4/1986 | Beckwith | 16/308 |
| 5,193,249 | A | 3/1993 | Bucher | |
| D335,622 | S | 5/1993 | Millsap | |
| 5,320,333 | A * | 6/1994 | Koch | 267/155 |
| 5,557,829 | A | 9/1996 | Schoen et al. | |
| 5,894,633 | A * | 4/1999 | Kaneko | 16/306 |
| 6,070,929 | A * | 6/2000 | Barkley | 296/76 |
| 6,193,225 | B1 * | 2/2001 | Watanabe | 267/180 |
| 6,520,557 | B1 | 2/2003 | Benthaus et al. | |
| 6,578,234 | B1 | 6/2003 | Westerdale | |
| 6,618,904 | B1 * | 9/2003 | Nagy | 16/370 |

FOREIGN PATENT DOCUMENTS

GB 2 069 037 A 8/1981

OTHER PUBLICATIONS

1997 Service Manual; GMP/97-WPB-1; 3 pages of Book 1; North American Operations, General Motors Corp.

* cited by examiner

*Primary Examiner*—H Gutman
(74) *Attorney, Agent, or Firm*—Brooks Kushman P.C.

(57) ABSTRACT

A link assembly forming a 6 bar linkage is integrally combined with a spring having a laterally coiled strand to form a hinge that is particularly well adapted to be installed in a small footprint. Such a unit is well adapted for installation within a peripheral channel of a vehicle body opening and to prop the closure in its open position. The present invention also provides a method for reducing packaging footprint of a vehicle closure hinge by integrating the 6 bar linkage with the laterally coiled strand, and selecting a strand shaping to reduce radial dimension of the coil and the coil cross-section while maximizing the radial dimension of material in the strand.

10 Claims, 7 Drawing Sheets

GUTTER MOUNTED DECK LID HINGE

BACKGROUND OF THE INVENTION

1. Field of the Invention

The present invention relates to spring biased vehicle closure hinges having a laterally coiled spring in integral construction with a link assembly having a reduced footprint for improved packaging in restricted areas, for example, the peripheral channel adjacent to a vehicle opening such as a rear trunk compartment.

2. Background Art

Many previously known vehicle closure hinges such as those used for engine compartment hoods and trunk lids often include spring biasing to assist displacement of the heavy panel which is displaced about a pivot axis at one end of the panel. However, a spring biasing assist force sufficient to maintain the closure in a fully open position is often provided by additional structure such as a prop rod, gas struts or the like to resist closure of the closure panel by the weight of the panel acting in a moment arm about the pivot axis or force transfer through a linkage.

One method to increase the spring biasing has been to use the torsion rods that can be routed across the car. However, while such spring biasing can be strong enough to resist closure, since the entire length of the torsion rod provides spring biasing force, the elongated torsion rods can obstruct and form a substantial impediment to the access through the opening or within the compartment covered by the closure panel. Other improvements to spring design, such as gas powered struts or powerful springs often require multiple installation steps since the spring biasing force unit must be separately installed to assist a conventional hinge structure. Such improvements substantially increase the difficulty of production, rendering the use of such components prohibitively expensive because they add production steps as well as additional pieces and mass to the vehicle. In the case of a gas strut power source, in a closed position the line up force in the strut is directed to the hinge pivot, thus forcing the pivot to endure high loading that shortens useful life of the original installation. Also, the life of a gas strut is both time-dependent and cycle-dependent, making it much less durable than a steel spring.

Moreover, once the spring force has been determined for a particular application, the hinge designs may not be readily incorporated into other vehicles having differently sized, weighted or balanced mass or center of gravity than the installation for which it was designed. As a result, the alternative assemblies may need redesigned linkage and/or biasing structures for each particular closure panel type, thereby substantially multiplying the number of assemblies and production pieces that must be made and inventoried in order to accommodate production and repair of the vehicles despite similar hinge needs and arrangements in the various openings of different vehicle styles.

A previously known attempt to address the problems discussed above involves the use of a single pivot arm as part of a four bar link assembly and integral clock spring. However, while the clock spring may provide substantial flexibility in the design and spring biasing force applied to a hinge mechanism, such springs require an extremely large envelope vertically as well as fore-and-aft to accommodate the four bar linkage and the coil spring. Moreover, the previous designs of this type have been complex requiring numerous parts and assembly operations, the addition of parts rendering the hinge relatively heavy, and thus have not found favor in many production applications due to the large expense compared to more conventional systems.

SUMMARY OF THE INVENTION

The present invention overcomes the above-mentioned disadvantages by providing a reduced footprint hinge construction for vehicle closure by combining a laterally coiled spring with a Watt 6 bar linkage that provides large travel displacement of the vehicle closure from closed to open position with spring biasing. The linkage resists lift-off of the leading edge or pivoted edge of the closure by rotating the deck lid about the leading edge location for a significant percentage of motion along the displacement path. Such linkage prevents the pivoted edge from being pushed off its seal by the forces of the coil spring when the closure is in its closed position.

In the preferred embodiment, the six bar linkage and integral spring combination is mounted in a structural gutter peripherally formed around the opening in the vehicle body. The complexity of manufacturing the various links in the linkage is reduced by matching the design of at least two of the bars in the six bar link so that separate tooling for manufacturing each link is not required. Moreover, the packaging size of the spring may be modified by shaping the cross-section of the strand forming the coil as well as by modifying the number of coils, the diameter of the coils and the thickness of the strand. As a result, the present invention provides a method for reducing the footprint in a manner that is particularly well adapted for mounting the mechanism in the peripheral gutter of a vehicle body compartment such as a trunk.

As a result, the present invention provides a method and apparatus for reducing packaging requirements for the vehicle closure hinge and providing it with spring biasing assist for opening and maintaining the open position of the closure. In particular, the mechanism can be designed to support the closure in a fully open position without external gas filled struts, prop rods or the like that would otherwise need to be packaged in the vehicle. Moreover, the vehicle closure hinge is not subject to performance variation under changing ambient conditions and weather, eliminates lift-off of the leading edge of the closure when in its closed position, and avoids obstruction of both the vehicle opening and the compartment accessed through the opening.

BRIEF DESCRIPTION OF THE DRAWINGS

The present invention will be more clearly understood by reference to the following detailed description of the preferred embodiment when read in conjunction with the accompanying drawing, in which like reference characters refer to like parts throughout the views, in which.

DETAILED DESCRIPTION OF THE PREFERRED EMBODIMENT

Figure 1:
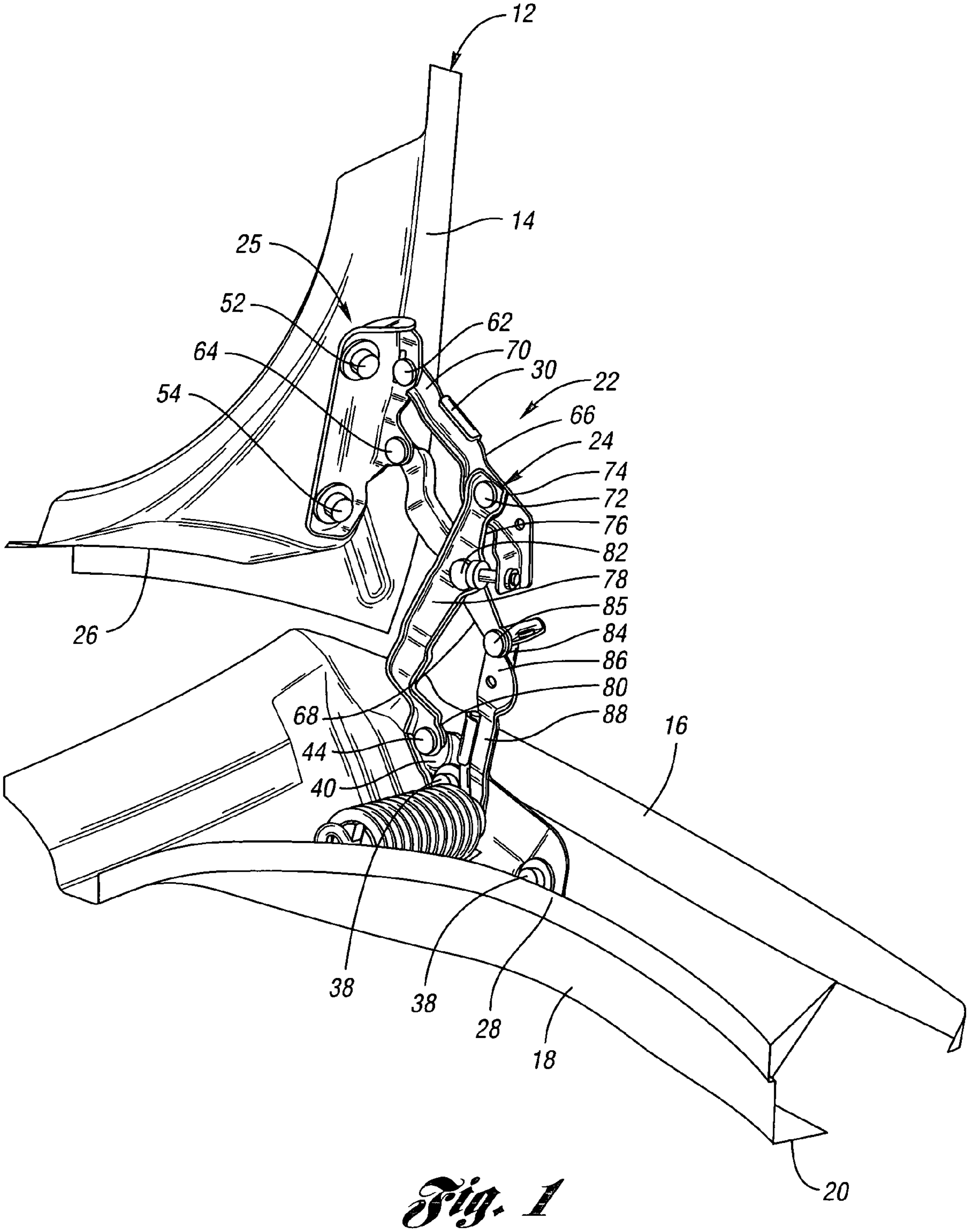
FIG. 1 is a perspective view of a portion of a vehicle body with the closure mounted by a hinge assembly with integral spring constructed according to the present invention.

Referring first to FIG. 1, a vehicle body 12 is as shown including a vehicle closure panel 14, such as a deck lid panel, adapted to close over an opening 18 in a body structure 16, the opening 18 providing access to a compartment 20 formed within the body structure 16. The closure panel 14 is secured at one end by a hinge mechanism 22 comprising a pair of hinge sets 24 mounted at spaced positions on a panel 14 near a leading or pivot edge 26. The opposite, trailing, or latch edge of the panel 14 include a latch mechanism for latching the panel 14 in the closed position over the opening 18 in a well-known manner.

In the preferred embodiment, the opening 18 is peripherally defined by a sheet metal structure 16 formed as a gutter trough 28. The peripheral gutter 28 adds strength to the body structure 16 adjacent the opening as well as a rain trough for controlled routing of rain water for draining. In the preferred embodiment, obstruction of the access opening 18 and the compartment 20 is minimized by locating each of the hinge sets 24 in the gutter 28.

Figure 2:
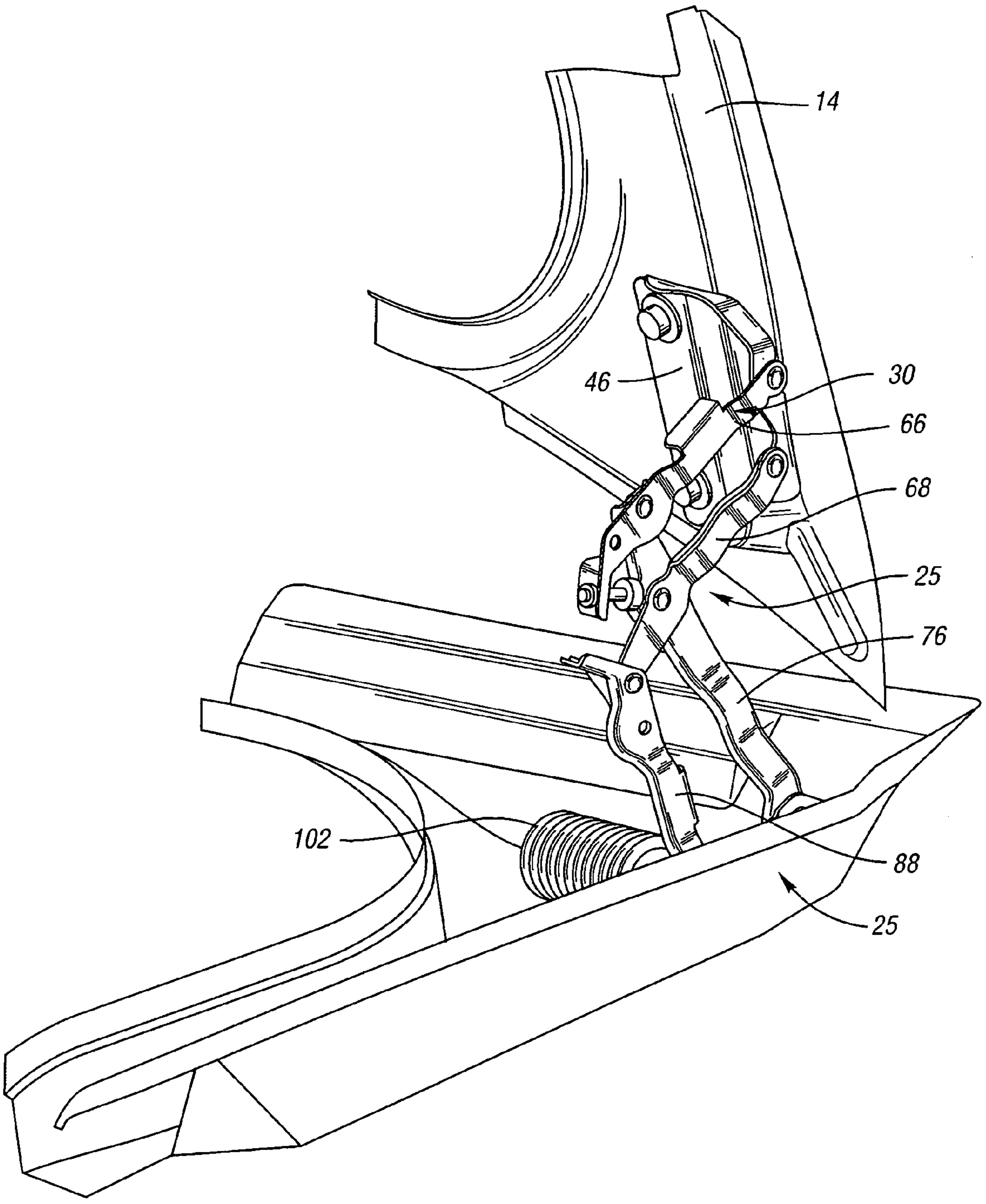
FIG. 2 is an opposing perspective view similar to FIG. 1 and also showing the hinge in its open position.

In the preferred embodiment, each hinge set 24 includes a Watt 6 bar link $A_{98}$ assembly 25 integrally constructed with a laterally coiled spring 102 for biasing members of the link assembly 25 to raise the panel 14 to its open position as shown in FIGS. 1 and 2 and described in greater detail below. The selection of a Watt 6 bar linkage is appropriate where wide open position or large range of motion is desired, although other linkage isomers and isomer variations may be selected without departing from the method of the present invention.

Figure 7:
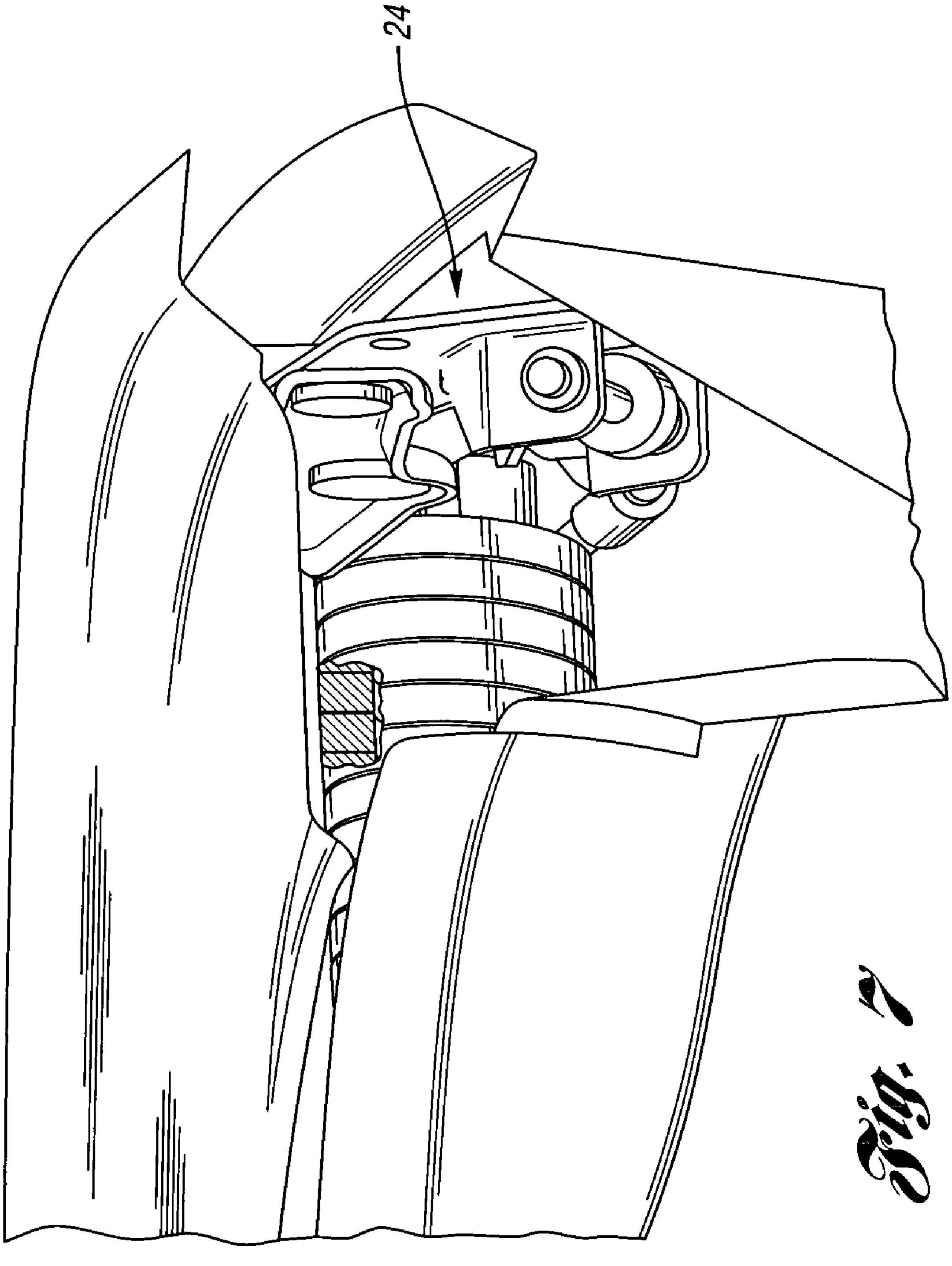
FIG. 7 is an enlarged, partially section view of a portion of the assembly.

As best shown in FIG. 1, the gutter 28 includes an expanded corner area receiving linkage assembly 30, the integral combination of link assembly 25 and spring 102. The assembly 30 is preferably coupled at one edge of the gutter, to allow a laterally coiled spring 102 extending outwardly from the assembly. The diameter of the coils, the number of coils and the thickness of the strand of the coil can be adjusted as desired to ensure sufficient torsion characteristics to operate the link assembly 30. In addition, as shown in FIG. 7, the shape of the strand may be modified to enhance or otherwise adjust the strength of the spring without changing size of the envelope. For example, the strength within the package may be maximized without expanding the envelope by shaping the strand as shown in FIG. 7 as rectangular in cross-section so that the radial width of the material in the coil is maximized for strength where the diameter of the coils or the number of coils or both must be limited for example, to fit within the gutter area.

Figure 3:
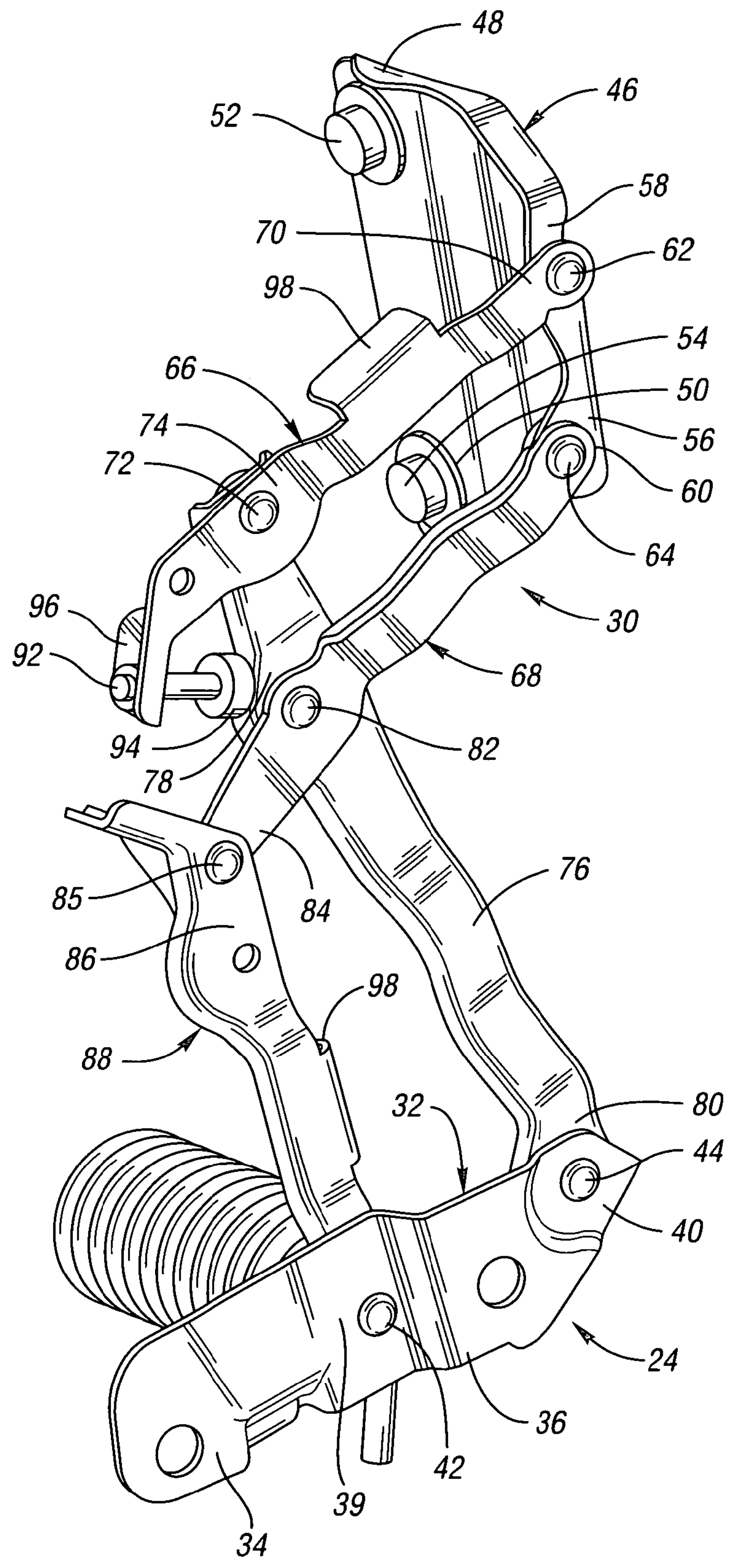
FIG. 3 is an enlarged perspective view of a portion of the device shown in FIG. 2.
Figure 4:
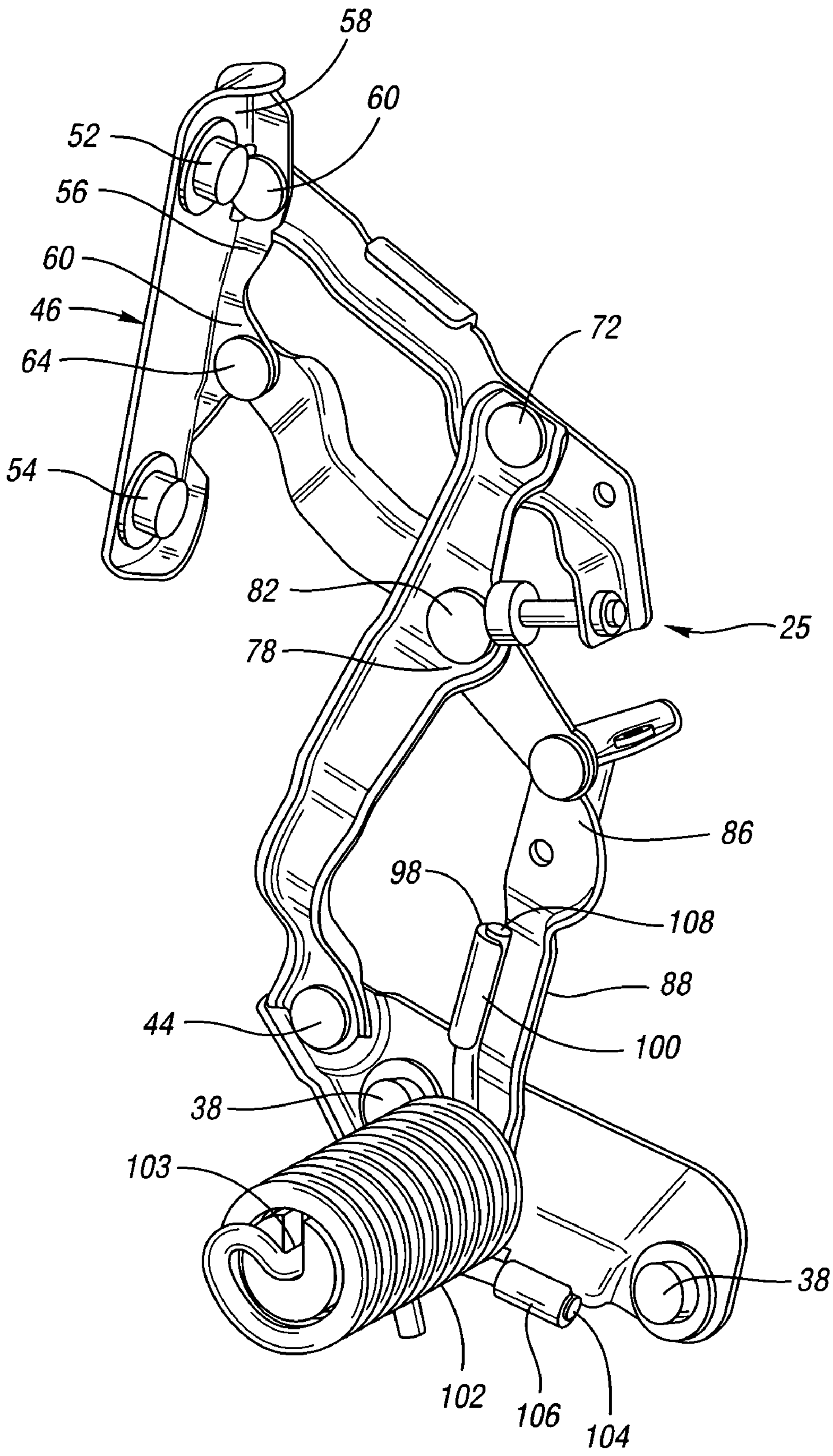
FIG. 4 is an enlarged perspective view of portion of FIG. 1.
Figure 5:
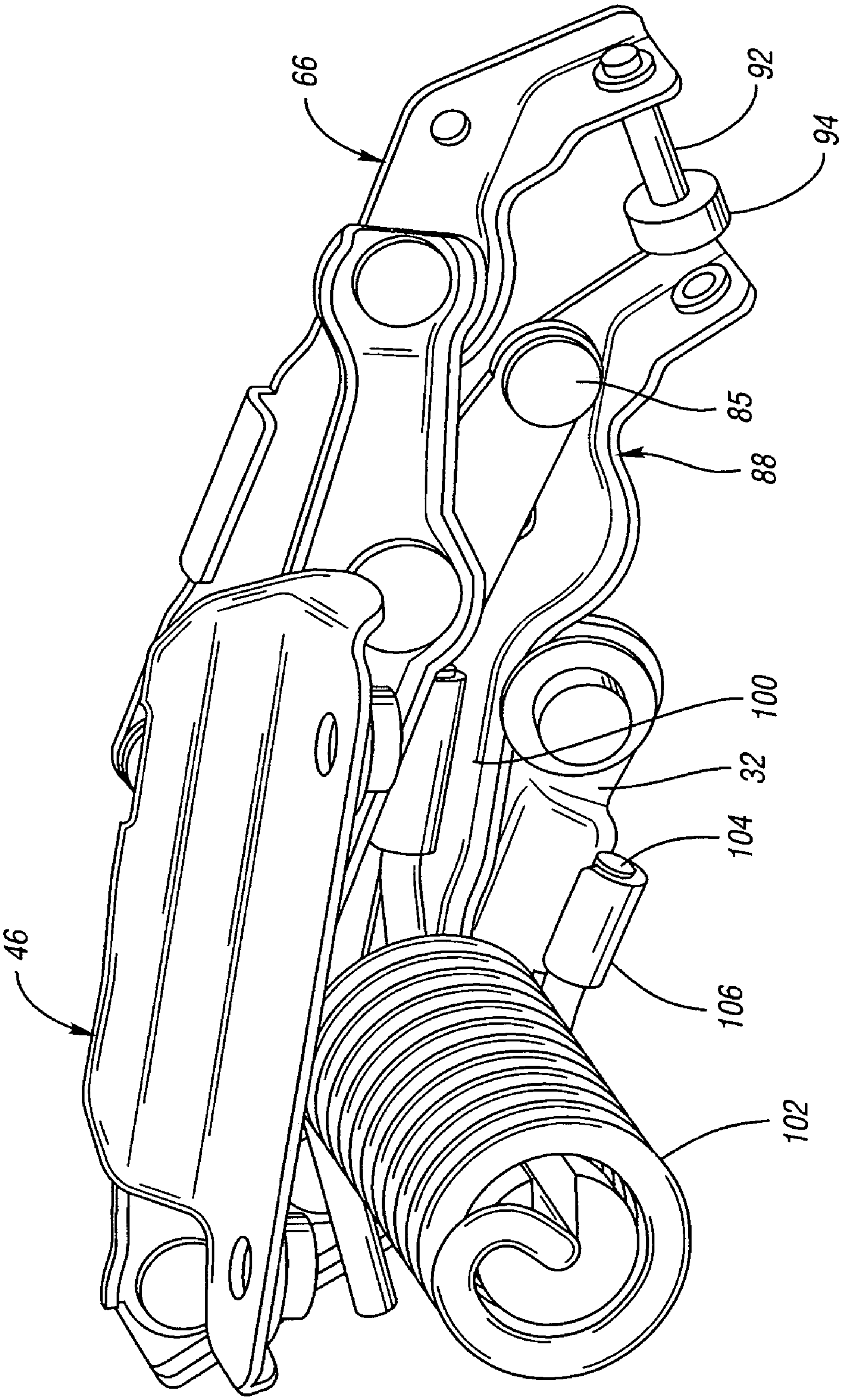
FIG. 5 is an enlarged perspective view similar to FIG. 4 but showing the hinge in its closed position.

Referring now to FIGS. 3 and 4, the link assembly 30 includes a body mount bar 32 having mounting flanges 34 and 36 that receive fasteners such as the bolts 38 (FIG. 4) shown in FIG. 1. The bar 32 also includes spaced pivot pin anchors 39 and 40 adapted to receive pivot pins 42 and 44, respectively.

The link assembly 30 also includes a closure mount bracket 46 with spaced mounting lands 48 and 50 (FIG. 3) for receiving mounting fasteners 52 and 54, respectively, as shown in FIG. 1. A link flange 56 on the closure mount 46 includes pivot supports 58 and 60 adapted to receive pivot pins 62 and 64, respectively.

Figure 6:
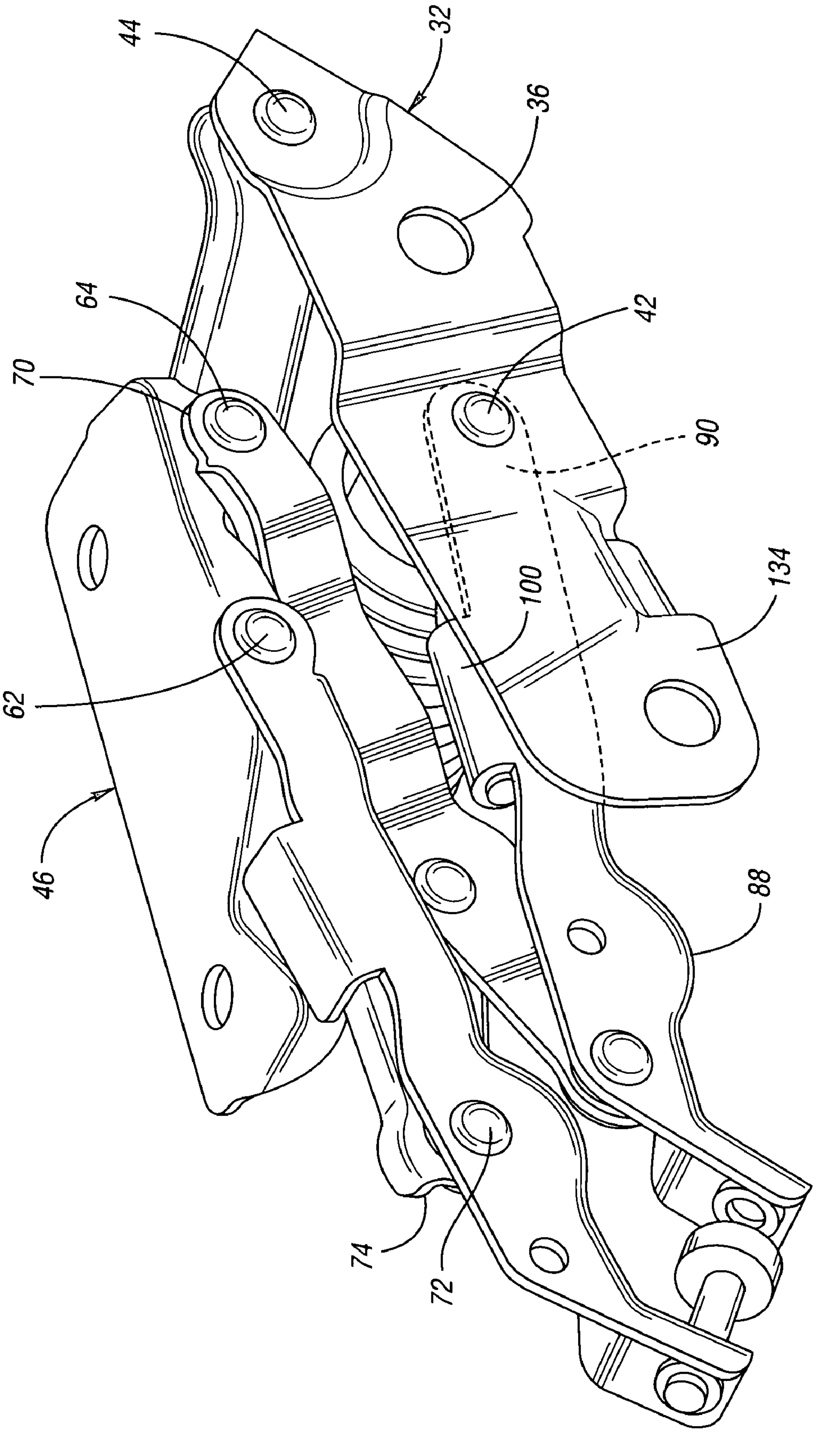
FIG. 6 is an enlarged perspective view similar to FIG. 3 but showing the hinge in its closed position.

The pivot pins 62 and 64 are preferably formed as rivets so as to pivotally engage an anchor for links 66 and 68, respectively. Pivoted end 70 of the link 66 is spaced apart from an opening receiving a pivot pin 72, that similarly engages and permits pivotal movement between the link 66 and the end 74 of a pivot link 76. The link 76 includes a pivot land 78 spaced from the pivot end 74 between the end 74 and the opposite end 80. The pivot land 78 is adapted to receive a pivot pin 82 while the pivot end 80 receives a pivot pin 44 at the pivot land 40. The pivot pin 82 is secured to pivotally secure intermediate portions of the link 68 and the link 76 together. Second pivoted end 84 of the link 68 is pivotally engaged with a pivot land 86 on a link member 88 by pivot pin 85. The other end of the link member 88 includes a pivot land 90 (shown in hidden line in FIG. 6) receiving the pivot pin 42 engaged in the body mount 32.

Preferably, the link member 66 and the link member 88 are formed from the same tooling so that two pieces of the link can be made without unduly increasing the cost of making the numerous links of the link assembly 25 and integral assembly 30. Accordingly, the land 74 remains unused in the link 88 whereas the land 86 remains unused in the link 66. Moreover, both members 66 and 88 include an extended end portion 96 opposite the end portion 70, adapted to support the stem 92 carrying a bumper 94 positioned to press against the edge of the link member 76 when the linkage 25 is extended to the open position of the closure panel. Preferably, the stem is threaded and threadably engaged in the end 96 of the link 66 so that the distance from the bumper can be adjusted to adjust the open position of the hinge. Of course, the end 96 remains unused in the piece used as link 88 in the mechanism 25. In addition, the link 88 carries a tab 98 that can be wrapped to capture end of the coil spring 102 as shown at 100 in FIGS. 4 and 6.

The link assembly 25 is biased by attaching a laterally coiled spring 102 formed from the single strand of material, for example steel, wrapped so that the coils are adjacent to each other and extend laterally from one coil end to a second coil end. The strand positioned at the second coil end is then extended in the direction along the axis of the coil toward the first end, preferably through the center of the coil. While the first end of the coil spring 102 adjacent the body mount 36 is wrapped in the flange 106, (FIG. 4) between the mounting lands 32 and 34 on the mount member 36, the second end of the strand returned toward the first end of the coil by a strand portion 103 (FIG. 4) extending across the coil, is then wrapped in a curled flange 100 formed by the tab 98. The coils in the spring 102 therefore impose spring biasing force between the end 108 and the end 104 substantially in the plane of displacement defined by the pivot pins 42, 44, 62, 64, 72, 82 and 85 of the assembly 25.

The vehicle closure hinge provides closure opening torque between the body closure bracket 46 and the body mount 36, and the center of rotation of the drive link in this case link 88, is positioned so that maximum room is allowed in the gutter for the largest possible spring. Moreover, the spring force can be adjusted as necessary to adjust for different masses and centers of gravity of closures, preferably by adjusting only dimensions of the structure of the spring, such as the diameter of coil or the number of coils in the winding, the size of the strand, and even adjusting the material mass of the spring by shaping the strand within fixed packaging size. In addition, the manufacturing cost is reduced despite the multiple bar construction of the link assembly, particularly where A single bar design can be used in two different locations within the multiple link assembly. Moreover, the spring assist component is integral with the hinge assembly and substantially reduces the package size and footprint of the hinge mechanism. Accordingly, the present invention provides additional functionality with less obstruction of vehicle compartments or the opening providing access to the compartment. The invention also reduces the number of components to be assembled into the vehicle by providing a single integral unit with a wide range of motion for the closure.

Having thus described the present invention, many modifications will become apparent to those skilled in the art to which it pertains without departing from the scope and spirit of the present invention as defined in the appended claims.

What is claimed is:

1. A vehicle closure hinge for a vehicle body with a compartment opening defined by a peripheral channel and with a closure, the hinge comprising:

a link assembly forming a scissors link for displacing the closure with respect to said opening;

a spring, integrally carried by said link assembly, and having a laterally coiled strand forming a coil, said coil having a first coil end with a first strand end, an opposite end, and a second strand portion extending across the coil from said opposite coil end to said first coil end, to engage said link assembly at said first coil end; and a mount securing said link assembly to said vehicle body in said peripheral channel.

2. The invention as defined in claim 1 wherein said integral assembly is installed as a unit in said channel.

3. The invention as defined in claim 1 wherein said strand is geometrically shaped to adjust spring biasing tension in said coil.

4. The invention as defined in claim 1 wherein said strand has a rectangular cross section.

5. The invention as defined in claim 4 wherein said cross section is square.

6. The invention as defined in claim 1 wherein said link assembly comprises a Watt six bar mechanism.

7. The invention as defined in claim 6 wherein at least two bars in said link assembly are duplicates.

8. A vehicle closure hinge for a vehicle body with a compartment opening and a closure panel, the hinge comprising:

a Watt six-bar link assembly forming a scissors link for displacing the closure panel with respect to said opening; and a spring, integrally carried by said link assembly, and having a laterally coiled strand forming a coil, said coil having a first coil end with a first strand end, an opposite coil end, and a second strand portion extending across said coil from said opposite coil end to said first coil end, to engage said link assembly at said first coil end.

9. The invention as defined in claim 8 and comprising a mount installing said link assembly as a unit in said vehicle body.

10. The invention as defined in claim 9 wherein the opening is defined by a peripheral channel and said mount is within said peripheral channel.

* * * * *